United States Patent [19]

Kiyohara et al.

[11] 4,125,759

[45] Nov. 14, 1978

[54] METHOD AND APPARATUS FOR SHORTCIRCUITING ARC WELDING

[75] Inventors: Michiya Kiyohara, Takatsuki; Toshiyuki Okada, Osaka; Hideyuki Yamamoto, Kobe, all of Japan

[73] Assignee: Osaka Transformer Co., Ltd., Japan

[21] Appl. No.: 622,655

[22] Filed: Oct. 15, 1975

[30] Foreign Application Priority Data

Oct. 17, 1974 [JP] Japan ................. 49-119734
Oct. 17, 1974 [JP] Japan ................. 49-119735

[51] Int. Cl.² .............................................. B23K 9/12
[52] U.S. Cl. ......................... 219/137 PS; 219/130.32; 219/137.2
[58] Field of Search ............. 219/137 PS, 131 F, 135, 219/131 R, 130.31, 130.32, 130.33, 130.21, 137.2

[56] References Cited

U.S. PATENT DOCUMENTS

| | | | |
|---|---|---|---|
| 3,530,359 | 9/1970 | Grist | 219/135 |
| 3,731,049 | 5/1973 | Kiyohara et al. | 219/131 F |
| 3,989,921 | 11/1976 | Ohi et al. | 219/131 F |
| 4,000,374 | 12/1976 | De Keyser | 219/131 F |

Primary Examiner—J. V. Truhe
Assistant Examiner—Clifford C. Shaw
Attorney, Agent, or Firm—Craig & Antonelli

[57] ABSTRACT

A method and apparatus for controlling the welding current in shortcircuit transfer arc welding including a method and control apparatus for maintaining the effective value of the welding current during arcing period at a predetermined value. Maintenance of the effective value of welding current during arcing period is necessary to keep the size of a fusion zone and the depth of penetration constant throughout welding operation.

6 Claims, 18 Drawing Figures

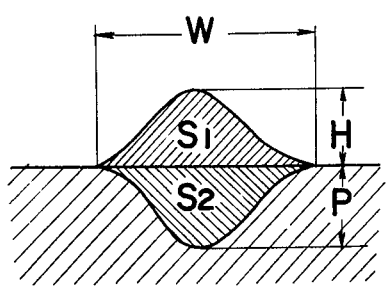
FIG. 1.
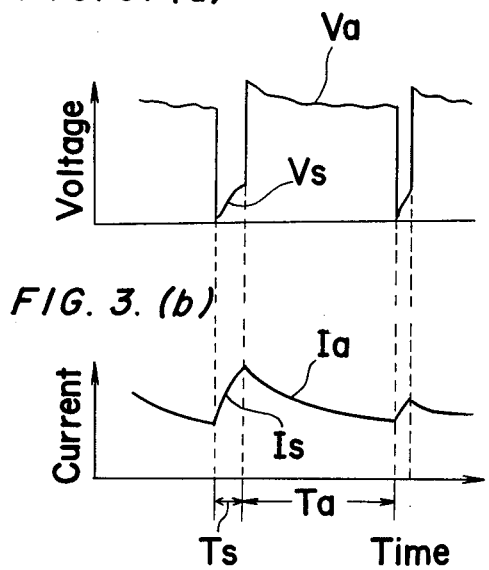
FIG. 3.(a)
FIG. 3.(b)
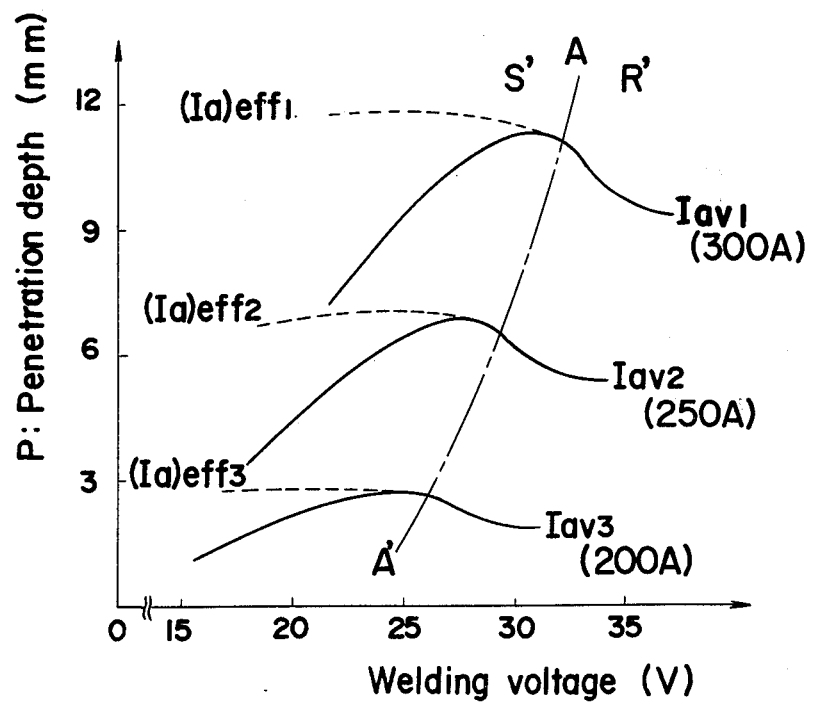
FIG. 4

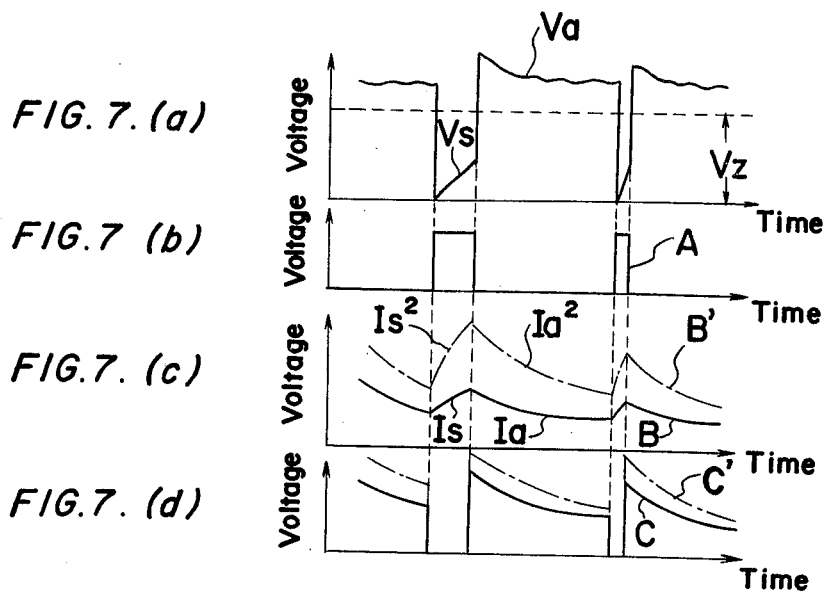
FIG. 7.(a)
FIG. 7 (b)
FIG. 7.(c)
FIG. 7.(d)
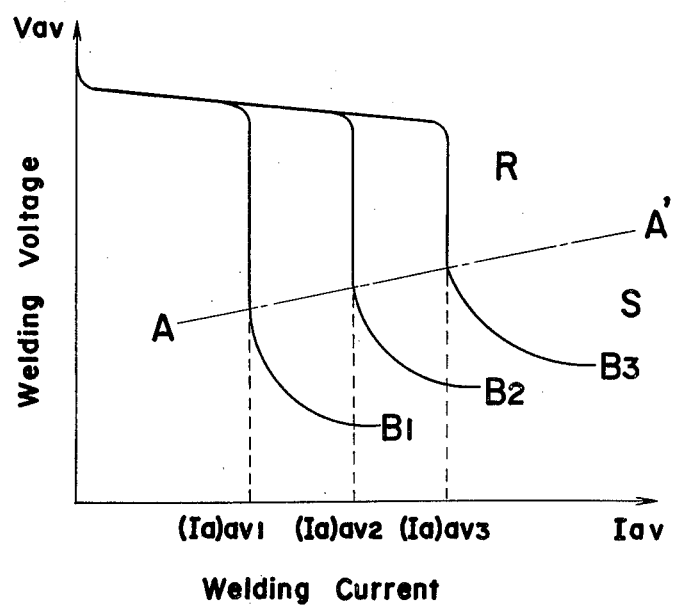
FIG. 8.

METHOD AND APPARATUS FOR SHORTCIRCUITING ARC WELDING

The present invention relates to an electric arc welding method and an apparatus therefor and more particularly, to an improvement in controlling the current for producing an arc between a workpiece and a consumable electrode to carry out a welding in optimum condition.

Conventionally, shortcircuiting arc welding has broadly been applied to welding of various metals such as steel, aluminum and copper, and alloys thereof, in which welding method, it has hitherto been a common practice to feed a welding electrode toward a welding portion at a speed equal to rate of melting of the electrode, with output from a welding power source being applied to the consumable electrode and a workpiece for repeated and alternate formation of shortcircuiting and arcing therebetween. In the above case, the feeding speed of the electrode with respect to the intended welding operation has been predetermined with reference to such variables as welding current, arc voltage and/or the number of shortcircuitings, prior to or during welding.

In general, a welded portion on the workpiece is defined by a deposited metal zone, which is formed by consecutively overlapping beads, and a groove-like fusion zone which is formed by a heat derived from the arc, as shown in FIG. 1 wherein $S_1$ and $S_2$ indicate cross sectional areas of deposited metal zone and fusion zone respectively, and reference characters P, W and H stand for depth of penetration, bead width, and height of excess weld metal respectively. Under the condition, for example, where the workpieces are of the same material and the speed of welding is constant, the cross sectional area $S_2$ of the fusion zone and the depth of penetration P are generally determined, depending on the total heat input supplied to the workpiece. The total heat input referred to above is generally expressed by the following equation;

$$Qa = \eta_{eff} \times Iav \times Vav \quad (1)$$

wherein $Qa$ is the amount of total heat input, $\eta_{eff}$ is heat transfer ratio, $Iav$ is a mean value of welding current, and $Vav$ is a mean value of welding voltage. In the welding, employing a consumable electrode, the heat transfer ratio $\eta_{eff}$ is usually in the range between 60 to 90%. Therefore, the cross sectional area $S_2$ of the fusion zone in the workpiece varies depending upon the mean value of a welding current $Iav$, and the mean value of a welding voltage $Vav$.

In the conventional shortcircuiting arc welding effected on aluminum at a constant welding speed, the relation between the cross sectional area of the fusion zone $S_2$ in the workpiece and the mean value of welding voltage $Vav$ is shown in a graph of FIG. 2, wherein each of the curves shown by real lines $Iav_1$ to $Iav_3$ indicates said relation in accordance with different mean values of welding current. The chain line AA' in the graph separates the region S where shortcircuiting occurs from the region R where short circuiting does not occur. In the region R, that is in the right side of the graph of FIG. 2, the length of the arc produced between the consumable electrode and the workpiece is rather long, and the welding voltage therebetween is high and the shortcircuiting does not occur. Whereas in the region S, that is in the left side of the graph, a fused portion of the electrode at the tip thereof repeatedly contacts or leaves a molten pool of the workpiece, and contact of the electrode tip and workpiece completes a circuit for the flow of electric current through the electrode. From the fact that the fusion zone area $S_2$ reaches its maximum value at a region along and close to the boundary line AA' in the region S, there exists a close relation between the fusion zone area $S_2$ and the occurence of the shortcircuiting.

FIGS. 3(a) and 3(b) are respectively graphs showing the wave form of the voltage generated between the welding electrode and the workpiece, and the wave form of the welding current, wherein the abscissa represents time while the ordinate represents voltage and current. The character $Ta$ represents an arcing period, and the character $Ts$ represents a shortcircuiting period. In the arcing period $Ta$, the voltage across the electrode and workpiece is indicated by a character $Va$, and the current therebetween is indicated by a character $Ia$. Whereas during in the shorticircuit period $Ts$, the voltage across the electrode and workpiece is indicated by a character $Vs$, and the current therebetween is indicated by a character $Is$. It has been well known that the arc voltage $Va$, the duration of the arcing period $Ta$, the arc current $Ia$, the duration of the arcing period $Ta$ and the duration of the shortcircuiting period $Ts$ usually fluctuate at each operation under the influence of, for example, voltage variations in the power source and/or the arc length. In the shortcircuiting period, the heat to be directly provided to the workpiece is produced by the resistance loss at the tip of the electrode, which heat may fuse the electrode to a certain extent, but is not sufficient to fuse the workpiece. Accordingly, the total heat $Qa'$ provided to the workpiece in each operation can be expressed as in the following equation;

$$Qa' = \frac{\eta_{eff}}{Ta + Ts} \int_0^{Ta} Ia \times Va \cdot dt \quad (2)$$

When welding is effected in the region S, where shortcircuiting occurs, the instantaneous value of the arc voltage in arcing period is generally constant, in spite of numbers of shortcircuiting taking place in said regions. Consequently, according to the equation (2), said heat $Qa'$ practically relies mainly upon the mean value of arcing current $(Ia)av$ in each welding period $(Ta + Ts)$, which is defined as;

$$(Ia)av = \frac{1}{Ta + Ts} \int_0^{Ta} Ia \cdot dt \quad (3)$$

From the above described fact, the main reason for the fusion zone area $S_2$ to decrease in the region S is mostly due to the occurence of shortcircuiting which shortens the arcing period $Ta$ and decreases the mean value of arcing current $(Ia)av$ in each welding period. Extended curves shown by dotted lines $(Ia)av_1$ to $(Ia)av_3$ in the region S indicate the results of experiments carried out by the present inventors taking into consideration of the above described fact of decrease of zone area $S_2$. In the experiment, aluminum alloy(5183) with diameter of 1.6 mm. is used for consumable electrode, aluminum alloy(5083) with thickness of 16 mm. is used for workpiece, and argon for shielding gas, and the welding speed is 25 cm./min. Said results of the experiments were obtained by controlling the power source in each welding operation so as to provide optimum electric power to the electrode, which method will be described later in more detail in the description of embodiments of the present invention.

In the foregoing description of arc welding apparatus, the voltage between the electrode and the workpiece, and the current therethrough are taken into consideration with respect to their mean values, however, in a similar manner, the description can also be made with respect to their effective values.

FIG. 4 shows the relation between the penetration depth P in the workpiece and the mean value Vav of welding voltage when the welding is effected on aluminum at a constant welding speed, wherein each of the curves shown by the real lines $Iav_1$ to $Iav_3$ indicate said relation in accordance with different mean values of welding current. The chain line AA' in the graph separates the region S' where shortcircuiting occurs from the region R' where an arc is maintained and shortcircuiting does not occur. Characteristics of the regions S' and R' are exactly the same as that of the regions S and R, described earlier with reference to FIG. 2. In the graph of FIG. 4, the depth of penetration P reaches its maximum value at a region along and close to the boundary line AA' in the region S', from which fact it is apparent that there is a close relation between the depth of penetration P and the occurrence of the shortcircuiting.

In the region S', wherein shortcircuiting occurs between the electrode and the workpiece, the heat to be directly provided to the workpiece is produced by the resistance loss at the tip of the electrode. Said heat may fuse the electrode to a certain extent, but is not sufficient to fuse the workpiece. Therefore, a total arc force F, which substantially acts on the workpiece only in the arcing period to form the fusion zone $S_2$, is not defined by the square of welding current mean value, i.e., $(Iav)^2$, but by the square of arcing period current i.e., $\{(Ia)av\}^2$. More specifically, the arc force F acting on the workpiece per a unit time can be described as in the following equation;

$$F \propto \frac{1}{Ta + Ts} \int_0^{Ta} Ia^2 \cdot dt \qquad (4)$$

From above equation (4), it is seen that the arc force F applied to the workpiece in a unit time is in relation to the square of effective value of arcing current $\{(Ia)eff\}^2$.

Accordingly, the reason for the penetration depth P to drop in the region S' even though the mean value of the welding current Iav being kept in constant amount, is that the arcing period is shortened and that the arcing current effective value $(Ia)eff$ is reduced, and that the arc force F is natually reduced.

Extended curves shown by dotted lines $(Ia)eff_1$ to $(Ia)eff_3$ in the region S' indicate the results of experiments carried out by the present inventors considering the above described reason for decrease in penetration depth P, under the same welding condition as former experiment. Said results of the experiments were obtained by controlling the power source in each welding operation, that is, by providing optimum electric power to the electrode, which method according to the present invention will be described in more detail later.

From the foregoing description, it is seen that the cross sectional area $S_2$ of the fusion zone is kept constant when the mean value of the arcing current is maintained in a predetermined amount and also that the penetration depth P is kept constant when the effective value of the arcing current is maintained in a preadjusted amount. It should be noted that the above described fact is not limited only to the welding of the aluminum but also to the welding of any welding material.

In an electric arc welding method, the cross sectional area $S_2$ of the fusion zone and the penetration depth P are determined mainly by the amount of the arcing current provided between the electrode and the workpiece in the period while the arc is maintained therebetween. Here, the arcing current is determined by the mean or effective value of the welding current and by the number of the shortcircuit occured therebetween. It is possible to avoid the variation in the cross sectional area $S_2$ of the fusion zone and in the penetration depth P to a minimum degree with respect to the fluctuations of the welding condition so long as the mean or the effective value of the arcing current is kept in a predetermined value.

Accordingly, an essential object of the present invention is to provide a shortcircuiting arc welding method by which satisfactory welding condition is maintained over the entire welding portion wherein cross sectional area of fusion zone and penetration depth thereof are kept in a constant amount.

Another important object of the present invention is to provide a shortcircuiting arc welding apparatus in which a mean value or an effective value of arcing current is maintained in a predetermined level without responding to the fluctuation in the condition of the arc or the number of the shortcircuitings and their duration.

The present invention is based on the findings by the present inventors that cross sectional area of fusion zone is kept constant when a means value of arcing current is maintained in a predetermined level, and also that penetration depth is kept constant when an effective value of the arcing current is maintained in a predetermined level. In other words, either the mean value of the arcing current or the effective value of the arcing current is required to be kept constant in order to keep either the cross sectional area of the fusion zone or the penetration depth in a constant amount.

According to a preferred embodiment of the present invention, there is disclosed method for effecting shortcircuiting arc welding through alternate repetition of arcing and shortcircuiting which comprises separation of only current flowing during arcing period from welding current wherein current flowing through a consumable electrode and a workpiece during shortcircuiting period and current flowing through the consumable electrode and the workpiece during arcing period are alternately present, and maintenance of an effective value of said separated current at a predetermined level for welding. The present invention also discloses a short circuiting arc welding apparatus which comprises a welding load including a consumable electrode, arc and a workpiece, a welding power source capable of adjusting output current thereof for supplying said output to said welding load, a welding current instantaneous value detection circuit connected in series to said welding load and said welding power source of detecting the welding current flowing through said welding load so as to provide an output voltage proportional to said instantaneous value, a discrimination circuit for discriminating whether the consumable electrode and the workpiece are in arcing period or shortcircuiting period through any one of variation of the current flowing through said welding load, variation of the welding voltage between said electrode and said workpiece and presence of light due to the arcing, and for providing an output therefrom corresponding to said arcing and shortcircuiting periods, a separation circuit which receives the output voltage from said welding current instantaneous value detection circuit and said discrimination circuit for separating, from said output voltage of said detecting circuit, only voltage equivalent to current flowing during said arcing period, as an output of said separation circuit, a reference voltage setting circuit which presets voltage equivalent to a mean value of current flowing only during said arcing period for providing said preset voltage as an output from said reference voltage setting circuit, and a comparison circuit which receives, as an input thereto, the output voltages from said reference voltage setting circuit and said separation circuit for generating signals corresponding to difference of said output voltages so as to supply said signals to said welding power source, value of said output current from said welding power source being adjusted, by said output voltage of said comparison circuit, so as to become current value corresponding to said voltage preset in said reference voltage setting circuit. By the shortcircuiting arc welding arrangement of the invention as described above, disadvantages inherent in the conventional shortcircuiting arc welding methods and apparatus are substantially eliminated.

These and other objects and features of the present invention will become apparent from the following description taken in conjunction with the preferred embodiment thereof with reference to the accompanying drawings in which, FIG. 5 is a schematic diagram of a shortcircuiting arc welding apparatus of the invention;

FIG. 6 is an electrical circuit diagram of the apparatus of FIG. 5;

FIGS. 7(a), (b), (c) and (d) are diagrams illustrating wave forms of voltage at main portions of the circuit of FIG. 6;

FIG. 8 is a diagram showing external characteristic curves of a welding power source shown in FIG. 6;

Before the description of the present invention proceeds, it is to be noted that like elements are designated by like reference numerals throughout several diagrams of the attached drawings.

Figure 2:
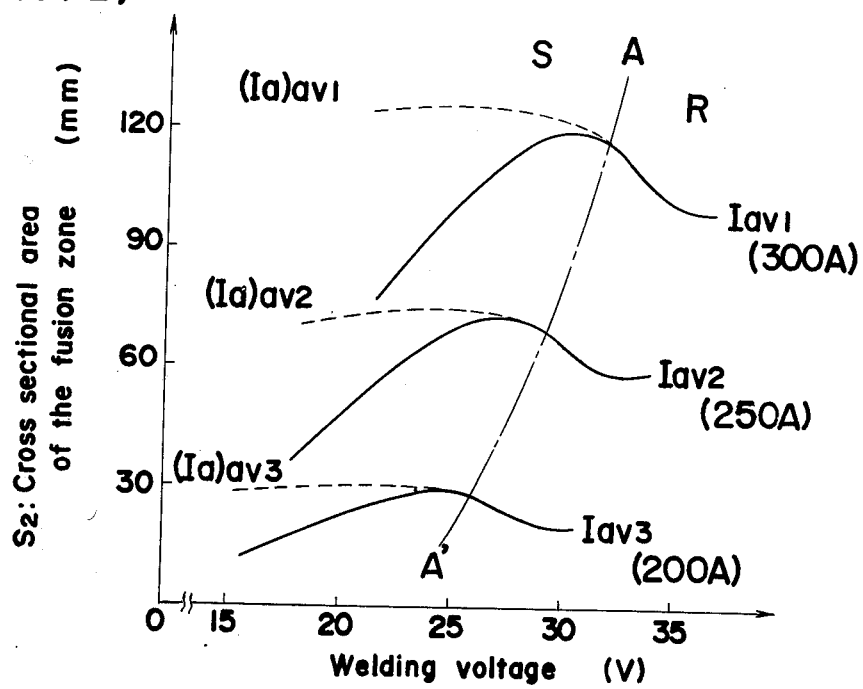
Figure 5:
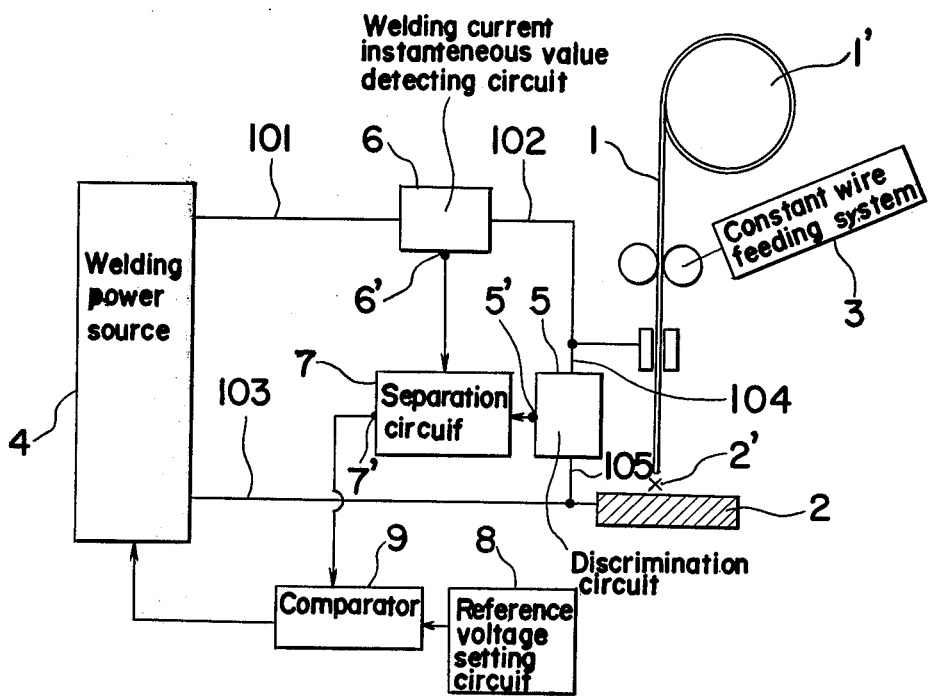

Referring now to FIG. 5, a consumable welding electrode 1 is drawn from a reel 1' by a conventional constant wire feeding system 3. The electrode 1 is constantly fed toward a welding arc 2' formed between the end of the electrode 1 and a workpiece 2 being welded. The welding arc 2', the welding electrode 1 and the workpiece 2 form a welding load.

A welding control system of the present invention comprises a direct current electric welding power source 4 connected across the welding load, i.e., the consumable electrode 1, welding arc 2' and workpiece 2, by leads 101, 102 and 103, an arc descriminating circuit 5 connected in parallel to the welding load by lead 104 and 105 to detect the arcing period by the voltage variation across the welding load and to develop a pulse signal (hereinafter referred to as a signal A) from its output 5' when arc is established in the welding load, a welding current instantaneous value detecting circuit 6 connected in series to the welding load by the leads 101 and 102 for detecting instanteneous value of the welding current flowing through the welding load and also for developing a signal (hereinafter referred to as a signal B) in voltage corresponding to instantaneous value of the welding current flowing therethrough from its output 6', a separation circuit or gate 7 for receiving the signals A and B from the arc descriminating circuit 5 and from the welding current instantaneous value detecting circuit 6, wherein the signal B is allowed to pass therethrough only when the signal A is in "on" state and then said signal B is integrated before being applied to its output 7' as an integrated signal (hereinafter referred to as a signal C), a reference voltage setting circuit 8 for producing preadjusted value of the reference voltage corresponding to the mean value of the arcing current, and a comparison circuit or comparator 9 for comparing the signal C with the reference voltage so as to provide an increase signal or a decrease signal to the welding power source 4 which comparator 9 develops the increase signal, when the signal C is smaller than the reference voltage, while, when the signal C is greater than the reference voltage, the same comparator 9 develops the decrease signal for the power source 4.

Figure 6:
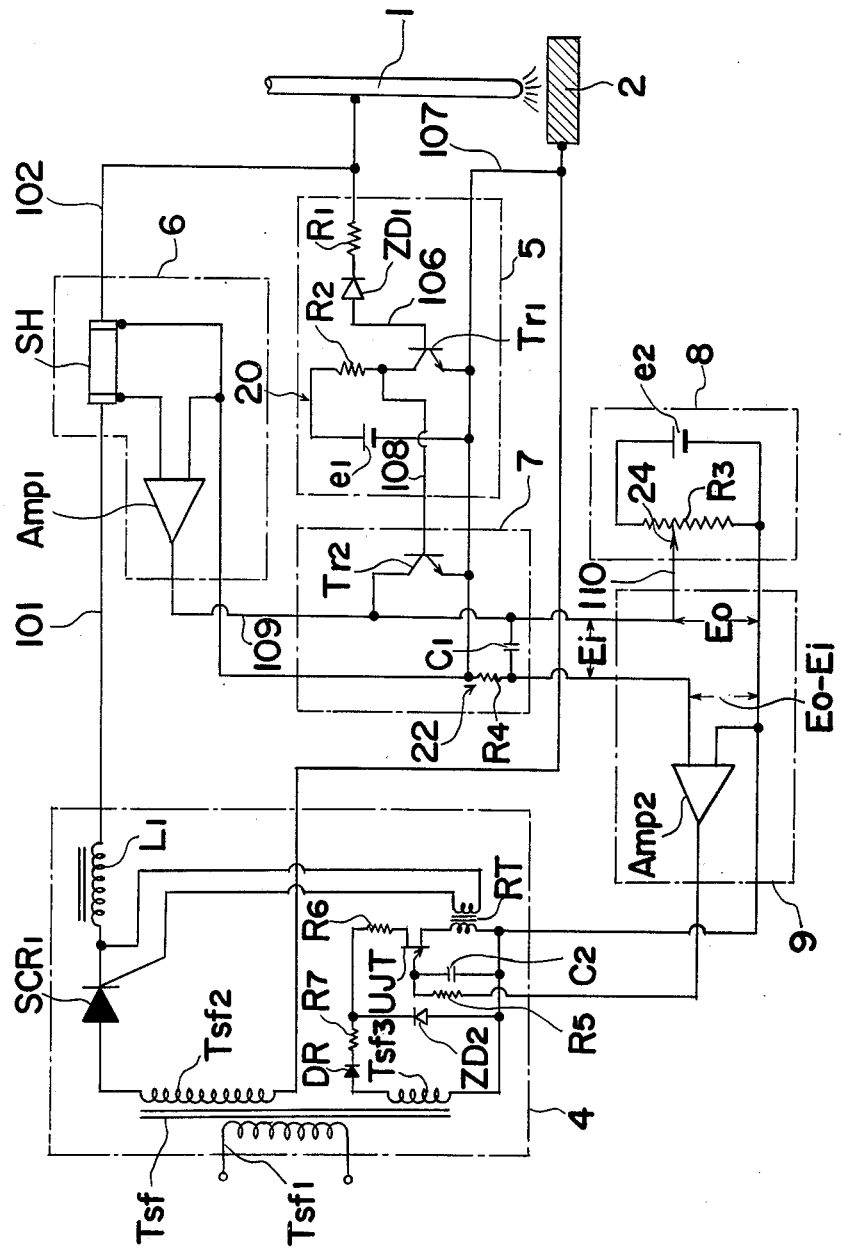

Referring also to FIG. 6 showing an electrical circuit diagram of the apparatus of FIG. 5, the circuits corresponding to those of FIG. 5 are surrounded by chain lines, with the same circuits being designated by the same numerals as those in FIG. 5.

The direct current electric welding power source 4 includes a three winding transformer $Tsf$ whose primary winding $Tsf_1$ is connected to a commercially available A. C. power source, while its secondary winding $Tsf_2$ is connected to the welding load through a thyristor $SCR_1$, and a direct current reactor $L_1$ in series connection thereto, for single phase half-wave rectification, and its tertiary winding $Tsf_3$ is connected in parallel to a primary winding of a pulse transformer RT through a rectifier DR, a resistor $R_7$, a resistor $R_6$, and a uni junction transistor UJT which are connected in series to each other, with a zener diode $ZD_2$ being connected in parallel to the series connection of the resistor $R_6$, uni junction transistor UJT and the pulse transformer RT to regulate the voltage thereof, and with a condenser $C_2$ being connected in parallel to the series connection of the uni junction transistor UJT and the pulse transformer RT, the common junction of the thyristor $SCR_1$ and the reactor $L_1$ being further connected to the gate of the thyristor $SCR_1$ through a secondary winding of the pulse transformer RT. In the direct current electric welding power source 4, the pulse produced by the uni junction transistor UJT is provided to the gate of the thyristor $SCR_1$ to shift the firing angle thereof and to control the rectified current.

The welding current instantaneous value detecting circuit 6 coupled to the power source 4 for detecting the welding current constantly includes a shunt SH connected in series to the reactor $L_1$ of the circuit 4 through the lead 101 and also to the consumable electrode 1 through the lead 102, and an amplifier $Amp_1$ coupled to the shunt SH for converting the welding current fluctuation to the voltage fluctuation as the signal B which is appearing at the output of the amplifier $Amp_1$. The anode of the shunt SH is connected to the ground, which in this case is the workpiece 1.

The arc discrimination circuit 5 includes a rectifier $ZD_1$ whose anode is connected to the consumable electrode 1 through a suitable resistor $R_1$ and whose cathode is connected to the base of a transistor $Tr_1$ through a lead 106. The emitter of the transistor $Tr_1$ is connected to a negative terminal of a suitable bias battery $e_1$, while the collector of the transistor $Tr_1$ is connected to a positive terminal of the bias battery $e_1$ through a suitable resistor $R_2$ to form a circuit 20. The emitter of the transistor $Tr_1$ is further connected through a lead 107 to the workpiece 2 which is a ground. The break-down voltage $Vz$ of the rectifier $ZD_1$ is preadjusted to a voltage somewhere between the shortcircuit voltage $Vs$ and the arc voltage $Va$, so that in the arcing period, the transistor $Tr_1$ is in "on" state to permit the circuit 20 to close and in the shortcircuit period, the transistor $Tr_1$ is in "off" state to open the circuit 20, thus the output 5' from the collector of the transistor $Tr_1$ producing the signal A as shown in FIG. 7(b).

The separation circuit or gate 7 includes a transistor $Tr_2$ having its base connected to the output 5' (FIG. 5) through a lead 108 to receive the signal A from the arc descriminating circuit 5 and having its collector connected to the output 6' (FIG. 5) a lead 109 to receive the signal B from the welding current instantaneous value detecting circuit 5. The emitter of the transistor $Tr_2$ is connected to the ground by the lead 107. Between the lead 109 from the output 6' and the lead 107 from the workpiece 1, an integrator 22 including a resistor $R_4$ and condenser $C_1$ is provided having a suitable time constant to average the signal B from the welding current instantaneous value detecting circuit 6. The averaged signal B which is referred to as signal C is applied to the comparator 9. However, due to function of the transistor $Tr_2$, the lead 107 and 109 are shortcircuited in the period when signal A is added to the base of the transistor $Tr_2$. When such shortcircuit occurs therebetween, the signal C disappears between the lead 107 and 109, in which case, the voltage therebetween will be zero.

The reference voltage setting circuit 8 includes a battery $e_2$ coupled with a potentiometer $R_3$. The adjustable contact $Z_4$ of the potentiometer $R_3$ is connected by a lead 110 to the positive terminal of the integrator 22 for comparing the reference voltage ($Eo$) with the integrated voltage ($Ei$). The reference voltage $Eo$ is equal to the voltage established by the integrator 22 while preferable arc is produced in the welding load.

The comparator 9 includes an amplifier $Amp_2$ which amplifies the potential difference obtained from the comparison between the reference voltage $Eo$ and the integrated voltage E, that is $Eo$-$Ei$. The output of the comparator 9 which is from the output of the amplifier $Amp_2$ is connected to the emitter of the uni junction transistor UJT in the electric welding power supply 4 through a suitable resistor $R_5$.

The operation of the welding control system is as follows. The amount of the welding current supplied to the welding load is detected by the detecting circuit 6 and said amount of the welding current is changed into voltage signal as the signal B shown in FIG. 7, which is applied to the gate 7, while the amount of the welding voltage is detected by the arc discriminating circuit 5. The output pulse of the arc descriminating circuit 5 is in "on" or "off" state respectively, when the input voltage becomes greater or smaller than the predetermined voltage $Vz$. More specifically, the output of the arc discriminating circuit 5 is in "on" or "off" state, when the welding condition becomes arcing or shortcircuiting as the signal A shown in FIG. 7. The "on" state of the signal A which is applied to the gate 7 permits the signal B to pass therethrough toward the integrator 22, whereas the "off" state of the signal A shortcircuits the signal B to disappear. Consequently, the signal B only in the arcing period is being integrated as a signal C which is the output signal of the gate 7 as shown in FIG. 7. The signal C is compared with the reference voltage $Eo$ from the reference voltage setting circuit 8. When the signal C (integrated voltage $Ei$) becomes smaller than the reference voltage $Eo$, due to the increase in the number of shortcircuitings or duration of shortcircuiting, the output of the comparator 9, which is related to the potential difference $Eo$-$Ei$, substantially increases. Accordingly, the increase of the potential difference $Eo$-$Ei$ advances the firing phase of the thyristor $SCR_1$, which increases the welding current being supplied from the welding power source 4. Consequently, the welding power source 4 prevents the arcing current from being decreased, that is, the mean value of the arcing current is approximately maintained at the mean value of the suitable welding current. On the contrary, when the signal C becomes greater than the reference voltage $Eo$, due to the decrease in the number of shortcircuitings or duration of short circuiting, the output of the comparator 9 decreases. Accordingly, the welding power source 4 prevents the welding current to overflow and consequently, the arcing current is approximately maintained at the mean value of the suitable arcing current.

Referring also to FIG. 8, there is shown an external characteristics of the welding power source 4, of the appratus shown in FIGS. 5 and 6, wherein the abscissa and the ordinate represent mean value of the welding current and mean value of the welding voltage, respectively. The curved lines designated by the characters $B_1$, $B_2$, and $B_3$ show the relation between the mean values of the welding current and voltage, with respect to different amount of the reference voltages preadjusted by the adjustable contact 45 in the reference voltage setting circuit 8. The broken line AA' separates the shortcircuit occuring region S from the arcing region R. In the region R which is above the line AA', the mean value of the arcing current is approximately the same as the welding current which is the mean value of the output current from the welding power source 4, because of the high welding voltage and no occurence of the shortcircuiting. Accordingly, in the region R, the external characteristics curves are drooping.

In the region S, which is below the line AA', the mean value of the arcing current is decreased due to the increase in the number of the shortcircuits and in their duration, however, the arcing current is compensated by welding control system of FIGS. 5 and 6 to be maintained approximately in a predetermined amount, resulting in drooping characteristics thereof, as shown with extended dotted line in FIG. 8.

Figure 9:
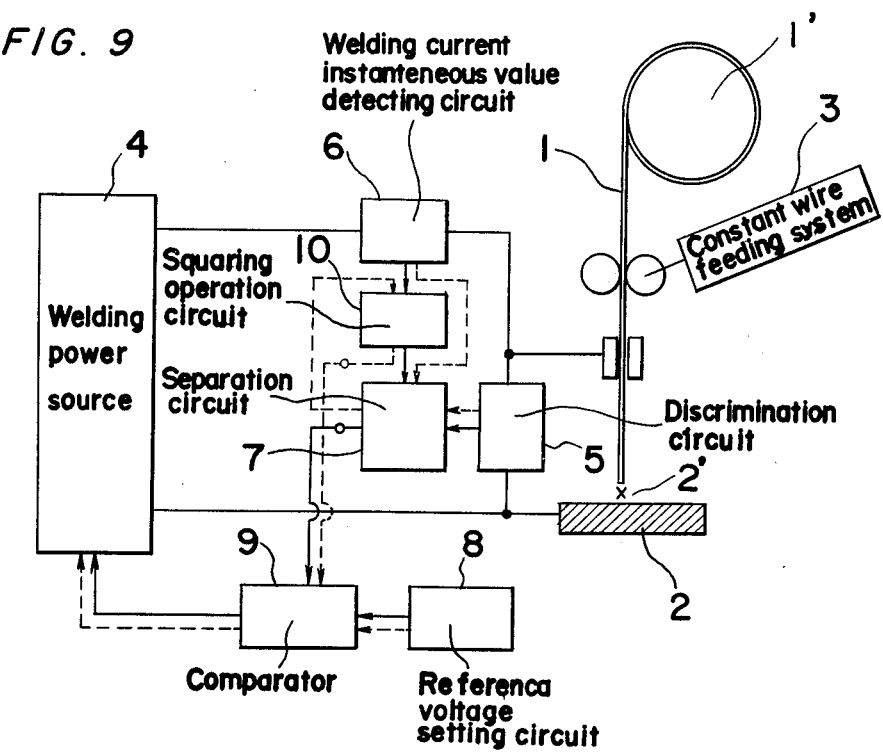
FIGS. 9 and 10 are similar diagrams to FIGS. 5 and 6, but particularly show a modification thereof.
Figure 10:
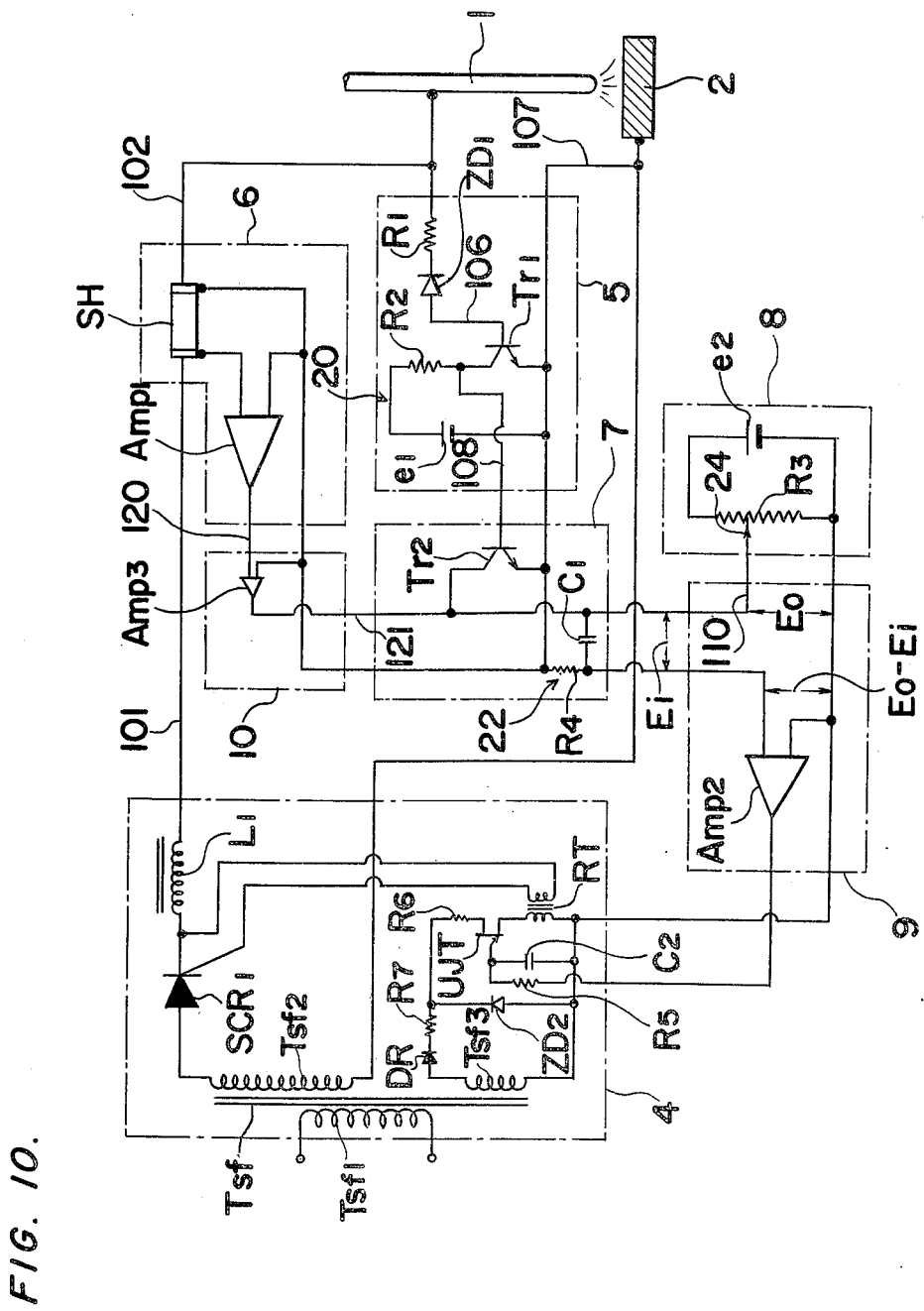

Referring now to FIGS. 9 and 10, there is shown a modification of the circuit of FIGS. 5 and 6. In this modification a squaring operation circuit 10 is further inserted between the welding current detecting circuit 6 and the separation circuit or gate 7. The squaring operation circuit 10 includes an amplifier $Amp_3$ wherein a lead 120 from the output of the welding current detecting circuit 6 is connected to the input of said amplifier $Amp_3$. The output of the squaring operation circuit 10, which is substantially proportional to the square of the voltage of the input, is supplied to the collector of the transistor $Tr_2$ by a lead 121.

In operation of the squaring circuit 10, the signal obtained from the welding current instantaneous value detecting circuit 6, that is, signal B is squared by the amplifier $Amp_3$. The output of the squaring circuit 10 produces a signal which is related to the square of effective value of the welding current, that is the signal B' shown in FIG. 7(c). The squared and averaged effective value of the welding current converted into voltage as a signal B' is further separated into arcing period signal in the separation circuit 7 as a signal C', which is compared with the preadjusted reference voltage from the reference voltage setting circuit 8. Here, the reference voltage is approximately equal to the voltage related to the arcing current during arcing period which is squared and then averaged. The potential difference between the reference voltage and the signal C' is amplified in the comparator 9 and further provided to the welding electric power source 4 in the same manner as in the former embodiment. Other function and construction of the circuits of FIGS. 9 and 10 are similar to those in the circuits of FIGS. 5 and 6, so that detailed description thereof is abbreviated for brevity.

Figure 11:
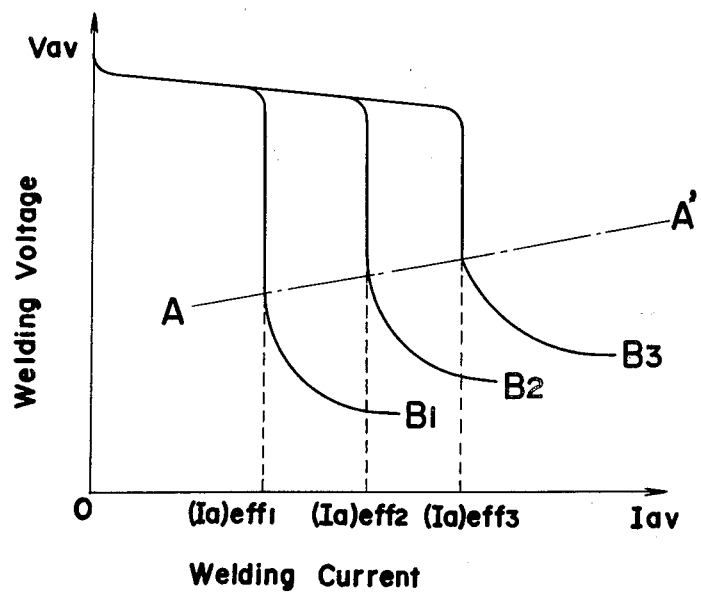
FIG. 11 is a diagram showing the external characteristic curves of the welding power source shown in FIG. 9.

In the FIG. 11, there is illustrated, in a similar manner to that shown in FIG. 8, an external characteristics of the welding power source 4 of the welding control system shown in FIGS. 9 and 10. In this illustration, the decreased effective value of the arcing current is compensated by the output signal from the comparator 9 to maintain the effective value approximately in a predetermined value.

Figure 13:
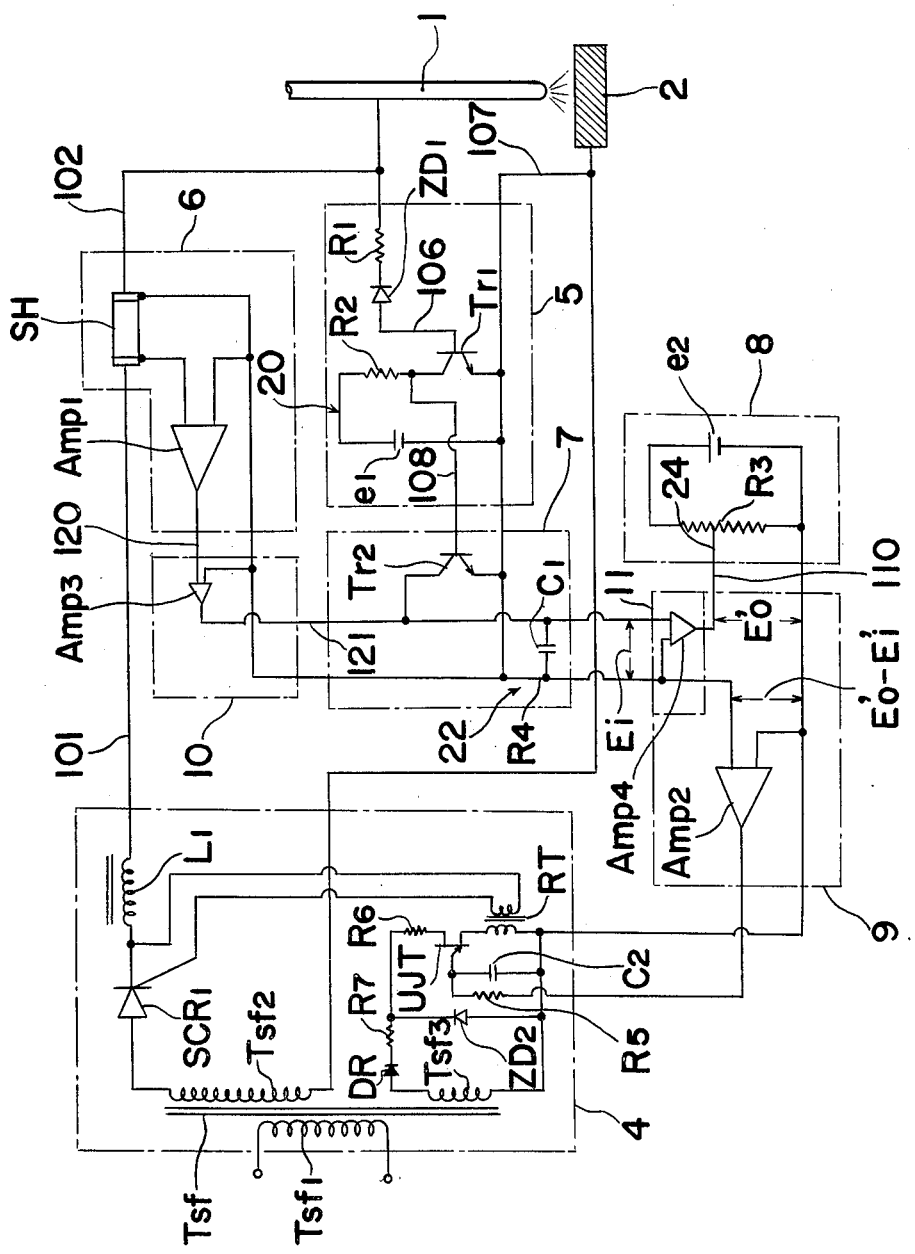
FIG. 13 is a similar diagram to FIG. 10, but particularly shows a modification thereof.

In above described modification of the embodiment, the comparator 9 receives the signal C' from the separation circuit 7 as a squared effective value of the arcing current converted into voltage. However, as shown in FIG. 13, the signal C' may be further converted into the effective value of the arcing current by a suitable root-mean-square operation circuit 11 including an amplifier $Amp$ 4 of a known type for obtaining root-mean-square values provided between the separation circuit 7 and the comparator 9 for taking the square root of the signal C', wherein the root-mean-square value of the signal C' is obtained to produce a effective value of the arcing current converted into voltage. The reference voltage, in this case must correspond to the effective value of the arcing current being produced in the arcing period. In other words, the signal C', which is to be provided to the comparator 9 may be any type of signal, as long as the signal is related to the effective value of the arcing current.

Figure 12:
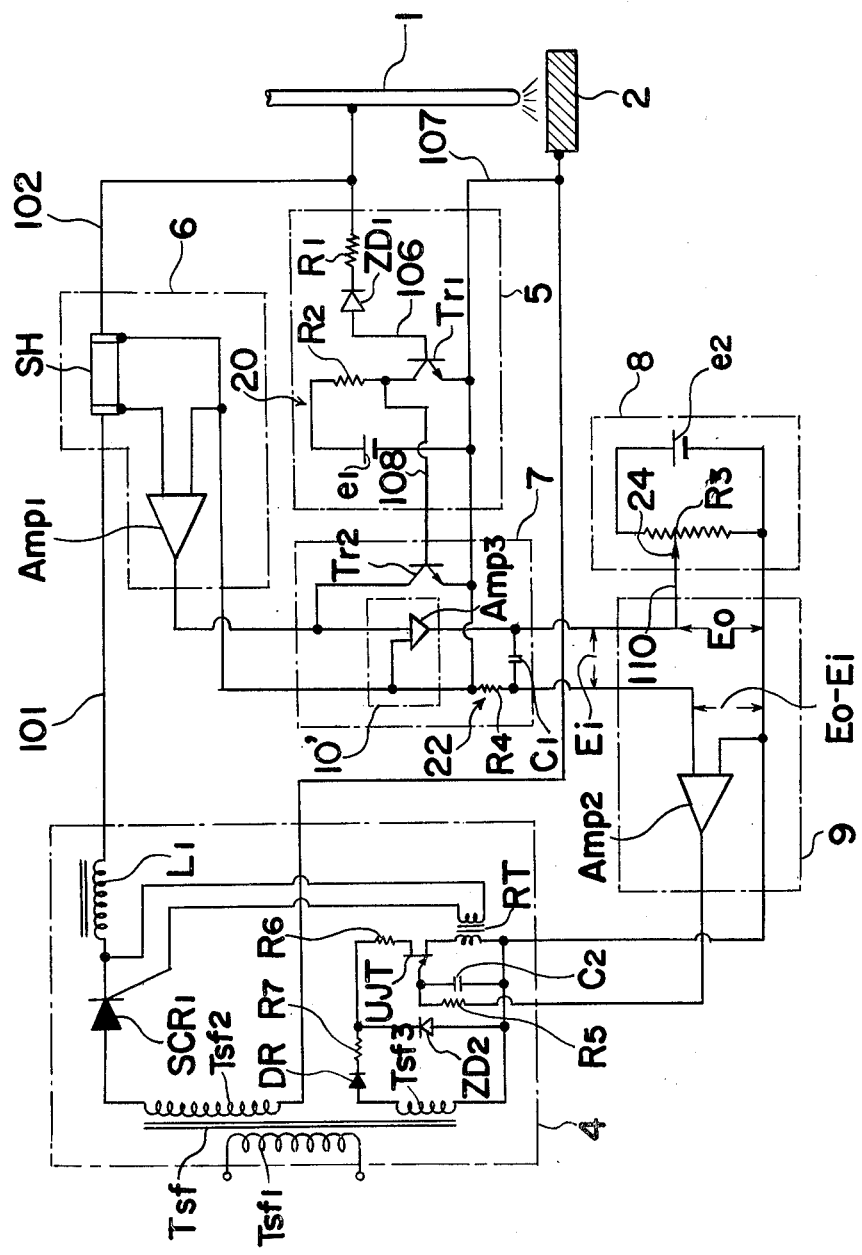
FIG. 12 is a similar diagram to FIG. 6, but particularly shows a further modification thereof.
Figure 14:
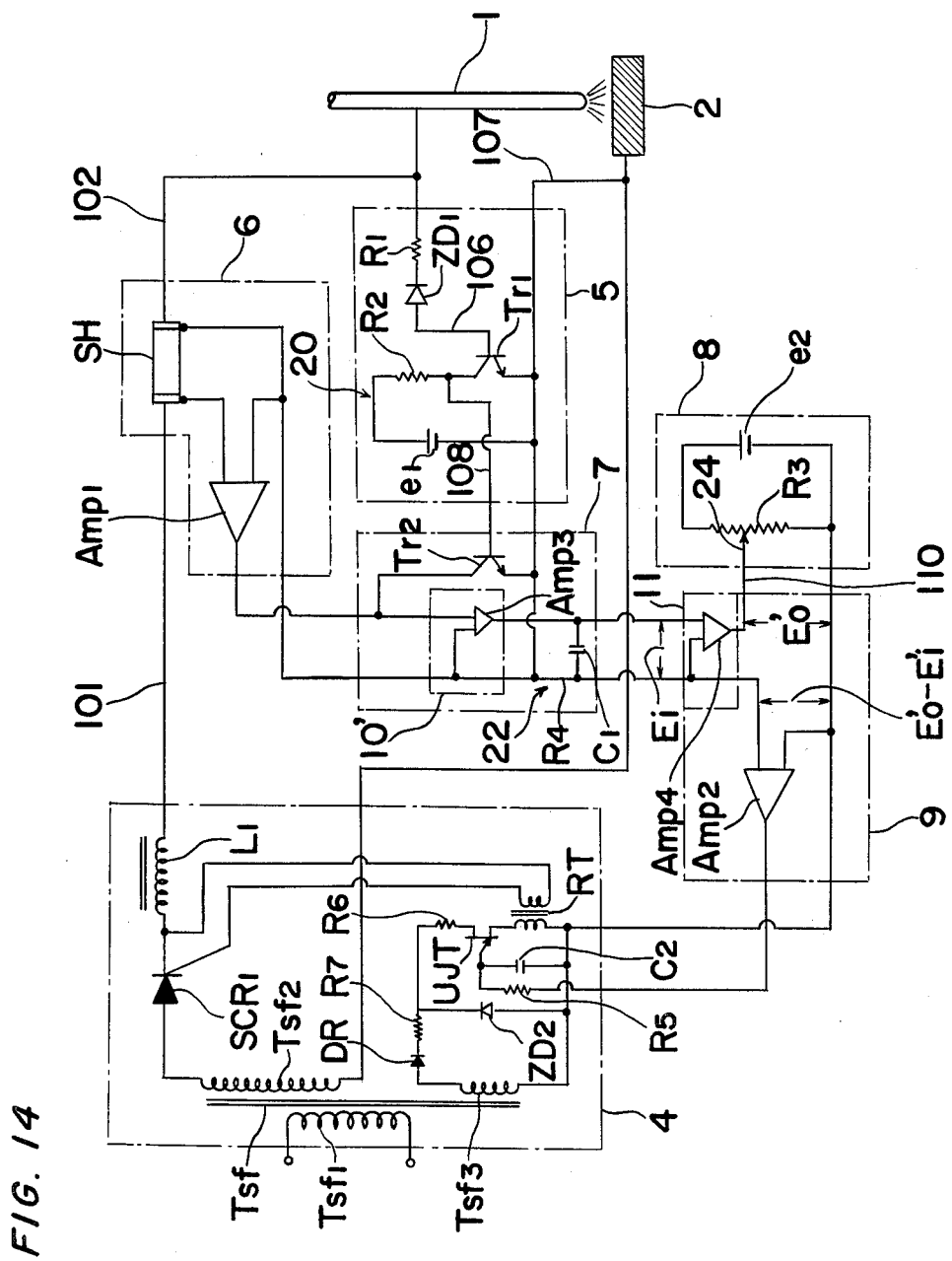
FIG. 14 is a similar diagram to FIG. 12, but particularly shows a modification thereof.

Referring now to FIG. 12, there is shown another modification of the circuit of FIG. 10. In this modification, the squaring operation circuit 10' is inserted between the collector of the transistor $Tr_2$ and the integrator 22, instead of between the welding current detecting circuit 6 and the gate 7. In this modification, the difference in function from that of the circuit shown in FIG. 9 is the position where the signal B is squared to provide effective value, that is, before or after the transistor $Tr_2$. In a similar manner, a suitable root operation circuit 11 including amplifier $Amp$ 4 may be provided between the separation circuit 7 and the comparator 9 for taking the square root of the signal C', as shown in FIG. 14.

Other function and the construction of the circuit of FIG. 12 is exactly the same as those in the circuits of FIG. 10, so that detailed description thereof is abbreviated for brevity.

It should be noted that the shunt SH described as employed in the welding current detecting circuit 6 of the above embodiments may be replaced by a circuit provided with current-voltage converter so long as the instantaneous value of the welding current is detected.

It should also be noted that in the arc descriminating circuit 5, the voltage across the electrode 1 and the workpiece 2 is applied to the transistor $Tr_1$ through the resistor $R_1$ and the rectifier $ZD_1$ to descriminate the arcing period by the "on" and "off" operation of the transistor $Tr_1$. However, the arc descrimination may be carried out by a photo transistor or the like provided adjacent the arc to supply a signal therefrom, while the arc is maintained.

It should also be noted that the single phase half-wave rectifier circuit described as provided with the thyristor $SCR_1$ in the welding power supply 4 may be replaced either by a three phase half-wave rectifier circuit, a three phase full wave rectifier circuit, a double star connection, or an interphase reactor rectifier circuit, and that the thyristor $SCR_1$ described as employed to control the firing phase of the rectifying current may be replaced by a magnetic amplifier or by some suitable electronic switches such as a thyristor provided between the terminals of the transformer, and that the rectifier circuit provided with one set of the welding transformer in the above embodiments, may be replaced by two sets of the transformers, one supplying a constant output current and the other controlling said output current in accordance to the signal from the comparator 9. In other words, the welding power source 4 may be applied with any types of construction, so long as the output current thereof can be controlled in relation to the signal from the comparator 9.

According to the shortcircuit arc welding method and the apparatus of the present invention, the mean value or the effective value of the arcing current is approximately maintained at constant value regardless of the number or duration of the shortcircuiting occurrence between the workpiece and the electrode, thus keeping the welding conditions, i.e., the cross sectional area of the fusion zone $S_2$ and the penetration depth P of the workpiece, at a constant level. Therefore, with the welding apparatus of the invention, the welding condition can be maintained uniform, even against external disturbances, such as fluctuation of the arc condition due to the contamination of the surface of the workpiece or fluctuation in the electrode feeding speed.

The arc welding method of the invention is particularly effective for marked reduction of occurrence of welding defects such as lack of fusion or incomplete penetration, and makes it possible to carry out optimum welding without requiring any particular skill, which fact is especially helpful in cases where the shortcircuiting arc welding is effected with comparatively short arc length, for example, to limit heat input in the welding of thin plates, or to increase the amount of deposited metal in the multi-layer welding of thick plates, or to prevent the weld beads from dripping in the welding at difficult positions such as in the vertical welding, horizontal position welding and the like.

Furthermore, the arc welding apparatus of the present invention is appropriate to the so-called M.I.G. welding method, i.e., arc welding using shield gas such as inert-gas to cover and to protect the arc. In such welding method, a suitable mean value or effective value of the welding current in arcing period, or of arcing current can be selected from a wide range of the voltage by adjusting the adjustable contact of the reference voltage setting circuit, so that stabilized welding arc can be secured over a wide rang of arc welding, from welding by long arc length wherein arcing seldom occurs to welding by short circuiting transfer arc wherein frequent arcing is involved, and even in irregular electrode feeding speed, welding arc is in stable condition due to the so-called intrinsic self-regulation of the arc length. Therefore, disadvantages inherent in the conventional M.I.G. welding method employing power source with approximately constant voltage characteristics, for example, adjusting the welding voltage simultaneously with the electrode feeding speed for adjustment, are eliminated.

Additionally, in the welding method of variable electrode feeding type as in the so-called submerged-arc welding wherein the feeding speed of the consumable electrode is varied according to the variation of the welding voltage through employment of power source having approximately constant current characteristics or drooping characteristics, if such power source is replaced by the power supplier of the invention, disadvantages such as sticking of the electrode into the workpiece is prevented through automatic increase of the output current from the welding power source in such a manner that the mean value or effective value of the arc current is maintained at approximately a constant level even when the number of shortcircuitings or duration of the same is increased, thus repairing work due to suspension of welding being much reduced with consequent improvement of working efficiency.

As is clear from the foregoing description, according to the shortcircuiting arc welding method and apparatus of the invention, the only current flowing during arcing period is separated from the welding current in which the current flowing through the consumable electrode and the workpiece during shortcircuiting period and the current flowing through the consumable electrode and the workpiece during arcing period are alternately present, with the mean value or the effective value of the separated current being maintained at a predetermined level, thus the cross sectional area of the fusion zone and the penetration depth thereof in the workpiece being maintained at approximately constant degree for optimum welding, by which arrangement, disadvantages inherent in the conventional shortcircuiting arc welding methods and apparatus are advantageously eliminated.

Although the present invention has been fully described by way of example with reference to the attached drawings, it is to be noted that various changes and modifications are apparent to those skilled in the art. Therefore, unless otherwise, such changes and modifications depart from the scope of the present invention, they should be construed as included therein.

What is claimed is:

1. A method for effecting shortcircuiting arc welding by the use of a shortcircuiting welding apparatus having a source of welding power having first and second terminals, a consumable electrode connected to said first terminal of said welding power source, and a workpiece connected to said second terminal of said welding power source for alternately repeating current flow of arcing current and shortcircuiting current between said consumable electrode and the workpiece, said method comprising the steps of:
    generating a root-mean-square value of said arcing current flowing between the consumable electrode and the workpiece
    comparing said root-mean-square value of arcing current with a reference value indicative of a predetermined value of said arcing current, and producing a control signal indicative of the difference between the measured root-mean-square value and the reference value; and
    regulating the welding power source in response to said control signal for adjusting the welding power source such that the root-mean-square value of arcing current is maintained at a value substantially equal to the reference value.

2. A method according to claim 1, wherein the consumable electrode and the workpiece form at least a part of a welding load circuit, and wherein the step of generating the root-mean-square value of arcing current includes:
    detecting an instantaneous value of welding current which consists of arcing current and shortcircuiting current flowing across the welding load circuit, respectively, during each cycle of alternate arcing and shortcircuiting;
    generating a first output signal proportional to the detected instantaneous value;
    discriminating whether the arcing is continued or whether the shortcircuit is continued;
    generating a second output signal only when it is discriminated that the arcing is continued;
    filtering the first output signal only when the second output signal is generated;
    calculating a square of the filtered first output signal;
    integrating the square of the filtered first output signal; and dividing the integrated value of the squared first output signal by the duration of said each cycle.

3. A method according to claim 1, wherein the consumable electrode and the workpiece form at least a part of a welding load circuit, and wherein the step of generating the root-mean-square value of arcing current includes;
    detecting an instantaneous value of welding current which consists of arcing current and shortcircuiting current flowing across the welding load circuit, respectively, during each cycle of alternate arcing period and shortcircuiting period;
    generating a first output signal proportional to the detected instantaneous value;
    discriminating whether the arcing is continued or whether the shortcircuit is continued;
    generating a second output signal only when it is discriminated that the arcing is continued;
    calculating a square of the first output signal;
    filtering the squared first output signal only when the second output signal is generated;
    integrating the squared and filtered first output signal; and
    dividing the integrated value of the squared and filtered first output signal by the duration of the cycle.

4. A shortcircuiting welding apparatus having a source of welding power having first and second terminals, a consumable electrode connected to the first terminal of said welding power source, and a workpiece connected to the second terminal of said welding power source, for alternately repeating current flow of arcing current and shortcircuiting current between said consumable electrode and the workpiece, said shortcircuiting welding apparatus comprising:

means for generating a root-mean-square value of arcing current flowing between the consumable electrode and the workpiece;

means for establishing a reference value indicative of a predetermined value of arcing current;

means for comparing the measured root-mean-square value with the established reference value for producing a control signal indicative of the difference between the measured root-mean-square value and the reference value; and means for regulating the welding power source in response to said control signal for adjusting the welding power source such that the root-mean-square value of the arcing current is maintained at a value substantially equal to the reference value.

5. A shortcircuiting welding apparatus as claimed in claim 4, wherein the consumable electrode and the workpiece form at least a part of a welding load circuit, and wherein said means for generating the root-mean-square value of arcing current comprises:

means for detecting an instantaneous value of welding current which consists of arcing current and shortcircuiting current flowing across the welding load circuit, respectively, during each cycle of alternate arcing and shortcircuiting, said detecting means generating a first output signal proportional to the detected instantaneous value;

means for discriminating whether the arcing is continued or whether the shortcircuit is continued, said discriminating means generating a second output signal only when it is discriminated that the arcing is continued;

means for filtering the first output signal only when the second output signal is present;

means for calculating a square of the filtered first output signal;

means for integrating the square of the filtered first output signal; and means for dividing the integrated value of the squared first output signal by the duration of said each cycle.

6. A shortcircuiting welding apparatus as claimed in claim 4, wherein the consumable electrode and workpiece form at least a part of a welding load circuit, and wherein said means for generating the root-mean-square value of arcing current comprises:

means for detecting an instantaneous value of welding current which consists of arcing current and shortcircuiting current flowing across the welding load circuit, respectively, during each cycle of alternate arcing and shortcircuiting, said detecting means generating a first output signal proportional to the detected instantaneous value;

means for discriminating whether the arcing is continued or whether the shortcircuit is continued, said discriminating means generating a second output signal only when it is discriminated that the arcing is present;

means for calculating the square of the first output signal;

means for filtering the squared first output signal only when the second output signal is generated;

means for integrating the squared and filtered first output signal; and means for dividing the integrated value of the squared and filtered first output signal by the duration of the each cycle.

* * * * *